US010802132B2

(12) United States Patent
Horst et al.

(10) Patent No.: US 10,802,132 B2
(45) Date of Patent: Oct. 13, 2020

(54) POSITION-SENSING SENSOR AND POSITION-SENSING SYSTEM

(71) Applicant: Siemens Aktiengesellschaft, Munich (DE)

(72) Inventors: Dieter Horst, Wendelstein (DE); Heinrich Meyer, Cadolzburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/328,545

(22) PCT Filed: Aug. 3, 2017

(86) PCT No.: PCT/EP2017/069672
§ 371 (c)(1),
(2) Date: Feb. 26, 2019

(87) PCT Pub. No.: WO2018/041515
PCT Pub. Date: Mar. 8, 2018

(65) Prior Publication Data
US 2019/0212433 A1  Jul. 11, 2019

(30) Foreign Application Priority Data
Aug. 31, 2016 (EP) .................................. 16186584

(51) Int. Cl.
*G01S 13/75* (2006.01)
*G01S 13/76* (2006.01)
(Continued)

(52) U.S. Cl.
CPC .......... *G01S 13/751* (2013.01); *G01S 13/765* (2013.01); *G01S 13/825* (2013.01); *G01S 13/878* (2013.01);
(Continued)

(58) Field of Classification Search
CPC .... G01S 13/751; G01S 13/765; G01S 13/825; G01S 13/878; G06K 19/0702;
(Continued)

(56) References Cited

U.S. PATENT DOCUMENTS

2012/0050016 A1* 3/2012 Bieber .................. G01S 13/878
340/10.1
2014/0085058 A1* 3/2014 Horst ................. G06K 7/10356
340/10.51

FOREIGN PATENT DOCUMENTS

DE     102005062827     6/2007
DE     102009008174     8/2010
(Continued)

OTHER PUBLICATIONS

PCT International Search Report and Written Opinion of International Searching Authority dated Oct. 12, 2017 corresponding to PCT International Application No. PCT/EP2017/069672 filed Aug. 3, 2017.

Primary Examiner — Sisay Yacob
(74) Attorney, Agent, or Firm — Cozen O'Connor

(57) ABSTRACT

A position-sensing sensor of a position-sensing system includes first and a second radio transponders that each have a transmitter/receiver connected to an antenna and has a memory for persistent data storage, wherein the first radio transponder has an energy supply source and is selectively switchable into a reduced energy consumption idle state and into an active operating state with complete range of functionality, where during the active operating state, a radio connection to a first radio transponder reader is established for position sensing, where the second radio transponder, which is inductively supplyable with energy by a radio transponder reader, upon entering a range of a second radio transponder reading unit, transfers the first radio transponder from the idle state into the active operating state or transfers (Continued)

position information associated with the second radio transponder to a server of the position-sensing system via the second radio transponder reader.

11 Claims, 2 Drawing Sheets

(51) Int. Cl.
  *G01S 13/82* (2006.01)
  *G06K 19/07* (2006.01)
  *G06K 19/077* (2006.01)
  *H04B 5/00* (2006.01)
  *G01S 13/87* (2006.01)

(52) U.S. Cl.
  CPC ..... *G06K 19/0702* (2013.01); *G06K 19/0709* (2013.01); *G06K 19/0724* (2013.01); *G06K 19/07767* (2013.01); *H04B 5/0062* (2013.01); *H04B 5/0075* (2013.01); *Y02D 70/10* (2018.01); *Y02D 70/164* (2018.01); *Y02D 70/166* (2018.01); *Y02D 70/42* (2018.01)

(58) Field of Classification Search
  CPC ........... G06K 19/0709; G06K 19/0724; G06K 19/07767; H04B 5/0062; H04B 5/0075; Y02D 70/10; Y02D 70/164; Y02D 70/166; Y02D 70/42
  See application file for complete search history.

(56) References Cited

FOREIGN PATENT DOCUMENTS

| | | |
|---|---|---|
| DE | 102012202920 | 8/2013 |
| EP | 2269322 | 1/2011 |
| EP | 3031039 | 6/2016 |
| WO | WO2007/074011 | 7/2007 |
| WO | WO2009/135722 | 11/2009 |
| WO | WO2013/017596 | 2/2013 |

* cited by examiner

POSITION-SENSING SENSOR AND POSITION-SENSING SYSTEM

CROSS-REFERENCE TO RELATED APPLICATIONS

This is a U.S. national stage of application No. PCT/EP2017/069672 filed Aug. 3, 2017. Priority is claimed on EP Application No. 16186584 filed Aug. 31, 2016, the content of which is incorporated herein by reference in its entirety.

BACKGROUND OF THE INVENTION

1. Field of the Invention

The invention relates to radio frequency identification (RFID) systems and, more particularly, to a position-sensing sensor and a position sensing system.

2. Description of the Related Art

WO 2013/017596 A1 describes a method for locating an RFID tag via at least one RFID reader, in which the RFID reader emits an interrogation signal that comprises a broadband signal. The RFID tag varies its antenna impedance so as to modulate the interrogation signal with a code signal and reflects it as a reflection signal. The RFID reader receives the reflection signal and produces the code signal and a scattered broadband signal therefrom. By comparing the broadband signal with the scattered broadband signal, the RFID reader determines a propagation time of the broadband signal. The RFID reader determines the distance between the RFID reader and the RFID tag from a resulting propagation time difference.

DE 10 2009 008174 A1 discloses a method for determining distance, speed and direction of movement of an RFID transponder, in which the RFID transponder is interrogated in a conventional manner via an RFID reader. To this end, the RFID reader emits a phase-modulated supply carrier signal. A radar module simultaneously emits a radar signal that is received and reflected by the RFID transponder. The supply carrier signal and the radar signal have different frequencies. The reflected radar signal is in turn received by the radar module. A position of the RFID transponder is determined from the reflected received radar signal. The radar signal is emitted in particular when no interrogation data are modulated on the supply carrier signal.

EP 2 269 322 B1 relates to a near-field communication device for detecting and reading external RFID tags, where the near-field communication device has a resonance loop antenna circuit. The resonance loop antenna circuit comprises an antenna having a non-constant antenna inductance and a variable component for setting the resonance loop antenna circuit. The antenna has a target operating range for near-field communication in which the antenna inductance is sensitive to interference, by way of which the target operating range can change. An integrated circuit is connected to the resonance loop antenna circuit and comprises a controller for the resonance loop antenna circuit, an inductance detector circuit, a waking circuit and an antenna setting circuit. The waking circuit reacts to a predefined change in the antenna inductance that is detected by the inductance detector circuit so as to switch the controller from a low-power sleep mode into a communication mode.

EP 3 031 039 A1 describes an RFID-based position detection system having an RFID tag attached to an object to be detected, where the RFID tag can be awoken from a low-power mode via a low-frequency waking signal. The waking signal comprises position information associated with an RFID reader detecting the RFID tag via the waking signal. After the RFID tag has been awoken by receiving the waking signal, the RFID tag generates a high-frequency response signal that comprises an identification code of the RFID tag and the position information transmitted by way of the waking signal. US 2015/0358697 A1 relates by contrast to an RFID-based position detection system in which an RFID tag is awoken from a low-power mode via an additional GPS sensor or motion sensor.

SUMMARY OF THE INVENTION

It is an object of the present invention to create a radio transponder-based position detection sensor that can be switched into a standby state with reduced power consumption, on the one hand, and that can be located reliably upon the occurrence of predefined events or upon reaching predefined reference points, on the other hand, and to provide a corresponding position detection system.

These and other objects and advantages are achieved in accordance with the invention by a position detection sensor and by a position detection system which, in accordance with the invention, comprises a first radio transponder able to be attached to an object to be detected, which transponder has a transceiver unit, connected to an antenna, for exchanging data via a radio transponder interface, a storage unit for persistent data storage and a power source that can be connected to the transceiver unit and the storage unit. The storage unit is readable or writable to via first radio transponder readers associated with a position detection system. The first radio transponder readers are preferably base stations of an RFID-based position detection system or form the same. Furthermore, at least one transponder identifier is stored in the storage unit of the first radio transponder. The first radio transponder is selectively switchable into a standby state with reduced power consumption and into an active operating state with full functionality. Furthermore, the first radio transponder is configured so as to establish at least one radio connection for position detection with at least one first radio transponder reader in the active operating state.

In accordance with the invention, a second radio transponder is provided, which can be supplied with power inductively by a radio transponder reader and has a transceiver unit, connected to an antenna, for exchanging data via a radio transponder interface and a storage unit for persistent data storage. The storage unit is readable or writable to via second radio transponder readers. The second radio transponder is preferably an ultra-high frequency (UHF) transponder, where the second radio transponder readers are UHF transponder readers in this case. Furthermore, at least one transponder identifier is also stored in the storage unit of the second radio transponder.

The second radio transponder is configured in accordance with the invention so as, upon entry into a detection range of a second radio transponder reader, to switch the first radio transponder from the standby state into the active operating state or to transmit position information associated with the second radio transponder to a server of the position detection system via the second radio transponder reader. In this way, there is no need for measures that require a constant power supply, such as the use of GPS sensors or inertial sensors or the monitoring of changes in antenna inductance, in order to reliably locate the first radio transponder, used for position detection, based on events or locations or to reactivate it from a low-power mode.

The first radio transponder and the second radio transponder may, for example, just be arranged in a common sensor housing and do not necessarily need to be electrically connected to one another. In this case, the second radio transponder, upon entry into a detection range of a second radio transponder reader, transmits position information, associated with the second radio transponder, to a server of the position detection system via the second radio transponder reader, without the first radio transponder having to be reactivated for this purpose. Preferably, the position information associated with a radio transponder comprises the respective transponder identifier. Advantageously, the transponder identifiers stored in the storage units of the first and of the second radio transponder are identical.

In accordance with one advantageous embodiment of the present invention, the first radio transponder is electrically connected to the second radio transponder. Here, the second radio transponder is configured to, upon entry into a detection range of a second radio transponder reader, switch the first radio transponder from the standby state into the active operating state. Accordingly, the first radio transponder is configured to, following activation from the standby state, establish at least one radio connection for position detection with at least one first radio transponder reader. The second radio transponder readers in this case therefore do not have to have a connection to a server of the position detection system. Furthermore, the storage unit of the first radio transponder is advantageously readable or writable to via second radio transponder readers via the second radio transponder. In this way, in addition to the transponder identifier, other data stored in the first radio transponder can be read or changed via a second radio transponder. The second radio transponder may furthermore in particular be integrated into the first radio transponder.

The position detection system in accordance with the disclosed embodiments of the invention comprises at least one position detection sensor in accordance with the above embodiments. Furthermore, a plurality of first radio transponder readers associated with a position detection system are provided, the first radio transponder readers each being configured to read or to write to a storage unit of a first radio transponder comprised by the position detection sensor. Furthermore, the position detection system in accordance with the disclosed embodiments of the invention comprises a plurality of second radio transponder readers that are each configured to inductively supply power to a second radio transponder comprised by the position detection sensor and to read or to write to a storage unit of the second radio transponder.

In accordance with one preferred embodiment of the position detection system in accordance with the invention, the first radio transponder readers are base stations of an RFID-based position detection system or form the same, whereas the second radio transponder is a UHF transponder and the second radio transponder readers are UHF transponder readers. This allows an inexpensive and reliable implementation of an RFID-based position detection system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE EXEMPLARY EMBODIMENTS

The present invention is explained in more detail below in one exemplary embodiment with reference to the drawing, in which.

DETAILED DESCRIPTION OF THE EXEMPLARY EMBODIMENTS

Figure 1:
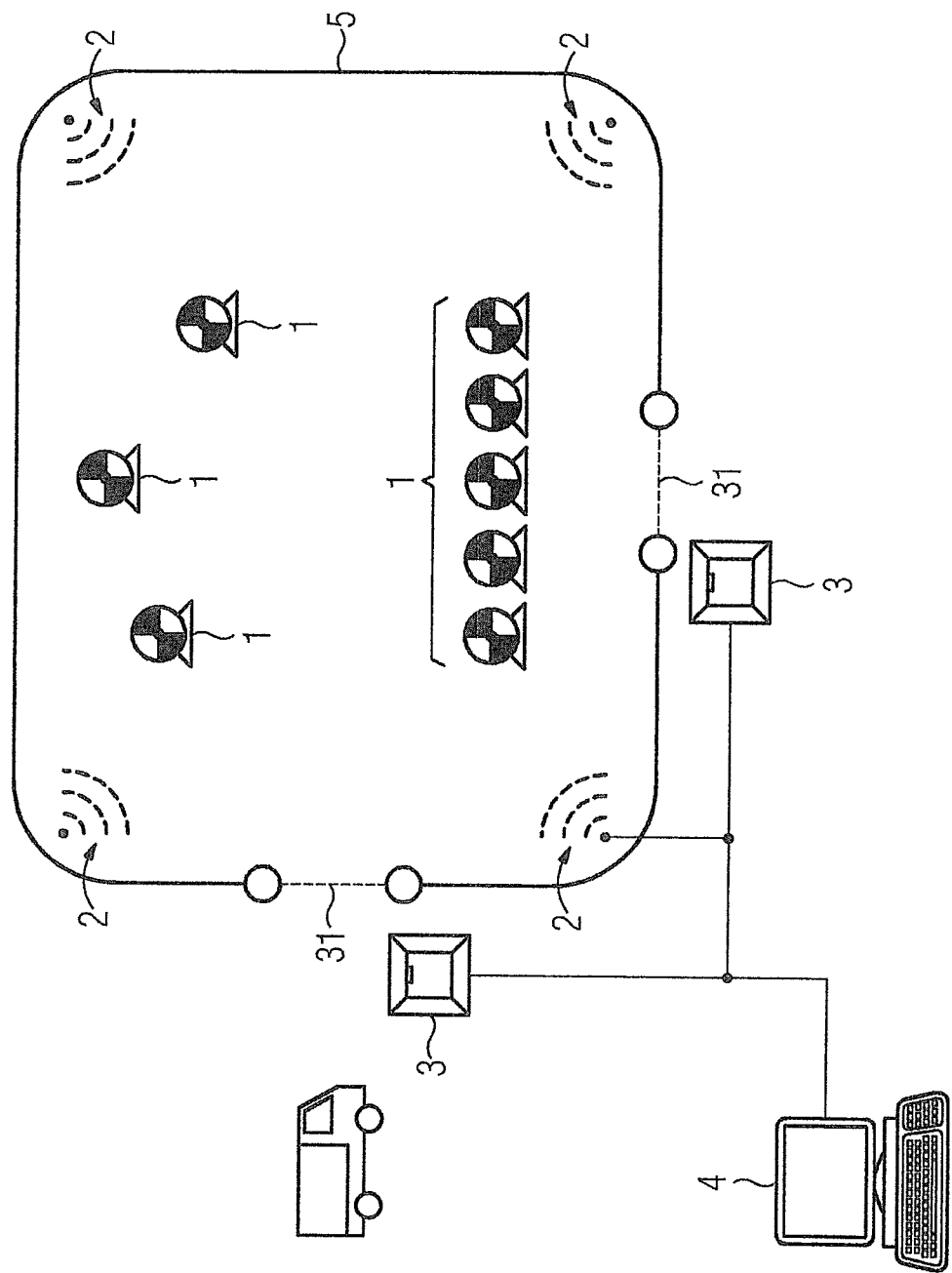
FIG. 1 shows an RFID-based position detection system having a plurality of radio transponder-based position detection sensors and a plurality of radio transponder readers in accordance with the invention.

The RFID-based position detection system illustrated in FIG. 1 allows monitoring of objects to be detected, with RFID-based position detection sensors 1 attached to the objects, within a predefined monitoring area 5, such as a warehouse. Arranged with the monitoring area 5 is a plurality of base stations 2, formed via first radio transponder readers, of the RFID-based position detection system and a plurality of UHF transponder readers 3 that constitute second radio transponder readers. The base stations 2 each have a communication connection to a server 4 of the RFID-based position detection system, whereas the UHF transponder readers 3 with their respective detection range 31 are advantageously directed toward access points of the monitoring area 5, such as toward doors of a warehouse.

Figure 2:
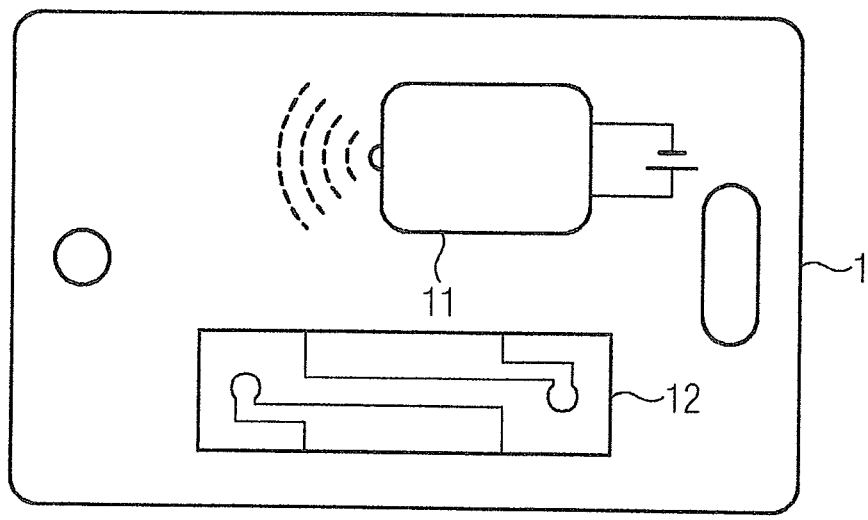
FIG. 2 shows a schematic illustration of a first embodiment of the position detection sensor of FIG. 1.
Figure 3:
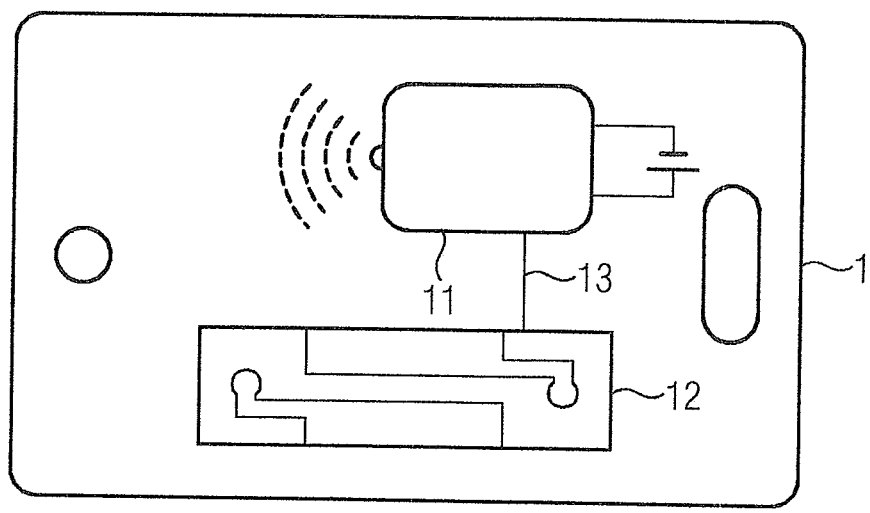
FIG. 3 shows a schematic illustration of a second embodiment of the position detection sensor of FIG. 1.

As shown in FIGS. 2 and 3, the RFID-based position detection sensors 1 each comprise, as a location sensor, a first radio transponder 11 that has a transceiver unit, connected to an antenna, for exchanging data via a radio transponder interface, a storage unit for persistent data storage and a power source, such as a battery or a rechargeable battery, which can be connected to the transceiver unit and the storage unit so as to supply these components with electric power. The storage unit of a first radio transponder 11 is readable or writable to via the first radio transponder readers integrated into the base stations 2 and has at least one transponder identifier as stored content. Accordingly, the first radio transponder readers integrated into the base stations 2 are configured so as to read or to write to the storage unit of a first radio transponder 11 and to determine a distance between a first radio transponder 11 and a first radio transponder reader, such as using a signal propagation time.

The first radio transponders 11 may be selectively switched into a standby state having reduced power consumption and into an active operating state with full functionality. Furthermore, the first radio transponders 11 are configured to establish at least one radio connection for position detection with at least one first radio transponder reader in the active operating state, so as to perform at least one determination of distance to a first radio transponder reader.

Furthermore, the RFID-based position detection sensors 1 each comprise a UHF transponder, able to be supplied with power passively or inductively by a radio transponder reader, as second radio transponder 12. The second radio transponders 12 each have a transceiver unit, connected to an antenna, for exchanging data via a radio transponder interface and a storage unit for persistent data storage. The storage unit of a second radio transponder 12 is readable or writable to via second radio transponder readers and has at least one transponder identifier as stored content, which transponder identifier is identical to the transponder identifier stored in the storage unit of the first radio transponder 11 in the present exemplary embodiment. The UHF transponder readers 2, as second radio transponder readers, are accordingly configured to inductively supply power to a second radio transponder 12 and to read or to write to the storage unit of the second radio transponder.

The second radio transponders 12 are furthermore configured to, upon entry into a detection range 31 of a second radio transponder reader, either switch the first radio transponder 11 from the standby state into the active operating state or transmit position information associated with the second radio transponder 12 to the server 4 via the second radio transponder reader. In this case, the position information also comprises the respective transponder identifier.

In accordance with the first embodiment, illustrated in FIG. 2, of a position detection sensor 1, unlike the second embodiment illustrated in FIG. 3, there is no electrical connection 13 between the first radio transponder 11 and the second radio transponder 12. Therefore, for the first embodiment, upon entry into a detection range 31 of a second radio transponder reader, there is no provision for the first radio transponder 11 to be switched from the standby state into the active operating state, but rather the second radio transponder 12 transmits its associated position information to the server 4 via the respective second radio transponder reader in this case.

In the second embodiment, illustrated in FIG. 3, having an electrical connection between the first radio transponder 11 and the second radio transponder 12, the second radio transponder 12 switches the first radio transponder 11 from the standby state into the active operating state upon entry into a detection range 31 of a second radio transponder reader. The first radio transponder 11, in the second embodiment, is accordingly configured to, following activation from the standby state, establish at least one radio connection for position detection with at least one first radio transponder reader. In the present exemplary embodiment, in the second embodiment, there is furthermore provision for the storage unit of the first radio transponder 11 to be able to be read or written to by way of second radio transponder readers via the second radio transponder 12, without a first radio transponder reader being necessary for this purpose.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A position detection sensor comprising:
   a first radio transponder which is attachable to an object to be detected, which is selectively switchable into a standby state with reduced power consumption and into an active operating state with full functionality and which is configured to establish at least one radio connection for position detection with at least one first radio transponder reader in the active operating state, said first transponder including:
      a transceiver unit, connected to an antenna, for exchanging data via a first radio transponder interface;
      a storage unit for persistent data storage that at least one of (i) readable and (ii) writable to via first radio transponder readers associated with a position detection system and in which at least one transponder identifier is stored; and
      a power source which is connectable to the transceiver unit and the storage unit;
   a second radio transponder which is supplied with power inductively by a second radio transponder reader, said second radio transponder including:
      a transceiver unit, connected to the antenna, for exchanging data via the radio transponder interface; and
      a storage unit for persistent data storage which is at least one of (i) readable and (ii) writable to via second radio transponder readers and in which at least one transponder identifier is stored;
   wherein the second radio transponder is configured to, upon entry into a detection range of the second radio transponder reader, one of (i) switch the first radio transponder from the standby state into the active operating state and (ii) transmit position information associated with the second radio transponder to a server of the position detection system via the second radio transponder reader.

2. The sensor as claimed in claim 1, wherein the first radio transponder is electrically connected to the second radio transponder; wherein the second radio transponder is configured to, upon entry into detection range of the second radio transponder reader, switch the first radio transponder from the standby state into the active operating state; and wherein the first radio transponder is configured to, following activation from the standby state, establish at least one radio connection for position detection with the at least one first radio transponder reader.

3. The sensor as claimed in claim 2, wherein the second radio transponder is integrated into the first radio transponder.

4. The sensor as claimed in claim 2, wherein the storage unit of the first radio transponder is at least one of (i) readable and (ii) writable to by second radio transponder readers via the second radio transponder.

5. The sensor as claimed in claim 3, wherein the storage unit of the first radio transponder is at least one of (i) readable and (ii) writable to by second radio transponder readers via the second radio transponder.

6. The sensor as claimed in claim 1, wherein the transponder identifiers stored in the storage units of the first and second radio transponders are identical.

7. The sensor as claimed in claim 1, wherein the position information associated with a radio transponder comprises the respective transponder identifier.

8. The sensor as claimed in claim 1, wherein the first radio transponder readers are or form base stations of an radio frequency identification (RFID) based position detection system.

9. The sensor as claimed in claim 1, wherein the second radio transponder is an ultra-high frequency (UHF) transponder; and wherein the second radio transponder readers are UHF transponder readers.

10. A position detection system comprising:
- at least one position detection sensor as claimed in claim 1;
- a plurality of first radio transponder readers associated with a position detection system, said first radio transponder readers each being configured to at least one of (i) read and (ii) write to a storage unit of a first radio transponder comprised by the position detection sensor;
- a plurality of second radio transponder readers which are each configured to inductively supply power to a second radio transponder comprised by the position detection sensor and to at least one of (i) read and (ii) write to a storage unit of the second radio transponder.

11. The system as claimed in claim 10, wherein the first radio transponder readers are or form base stations of a radio frequency identification (RFID) based position detection system; wherein the second radio transponder is a ultra-high frequency (UHF) transponder; and wherein the second radio transponder readers are UHF transponder readers.

* * * * *